United States Patent [19]

Moyle et al.

[11] Patent Number: 5,061,661
[45] Date of Patent: Oct. 29, 1991

[54] METHOD FOR PRODUCING TUNGSTEN CARBIDE AND CEMENTED TUNGSTEN CARBIDE ARTICLE THEREFROM HAVING A UNIFORM MICROSTRUCTURE

[75] Inventors: David R. Moyle, Sayre; Geoffrey L. Harris, Monroeton; Robert F. Northrop, Towanda, all of Pa.

[73] Assignee: GTE Products Corporation, Stamford, Conn.

[21] Appl. No.: 559,546

[22] Filed: Jul. 23, 1990

Related U.S. Application Data

[63] Continuation of Ser. No. 343,118, Apr. 25, 1989, abandoned.

[51] Int. Cl.$^5$ .................. C04B 35/56; C22B 57/00; B22F 9/00
[52] U.S. Cl. .................. 501/87; 75/240; 75/241; 419/23; 419/18; 423/440
[58] Field of Search .................. 75/240, 241; 419/23, 419/18; 423/440; 501/87

[56] References Cited

U.S. PATENT DOCUMENTS

| | | | |
|---|---|---|---|
| 2,113,171 | 4/1903 | Cooper | 501/87 |
| 2,286,672 | 6/1942 | De Lamatter | 423/440 |
| 3,850,614 | 11/1974 | Bleecker | 75/0.5 BB |
| 4,402,737 | 10/1983 | Kronenwelter et al. | 75/0.5 BB |
| 4,820,482 | 5/1987 | Fischer et al. | 419/15 |
| 4,851,041 | 7/1989 | Polizzotti et al. | 419/23 |

FOREIGN PATENT DOCUMENTS

| | | | |
|---|---|---|---|
| 617860 | 4/1961 | Canada | 423/440 |
| 680698 | 5/1951 | United Kingdom | 419/18 |
| 802802 | 10/1958 | United Kingdom | 423/440 |

Primary Examiner—William R. Dixon, Jr.
Assistant Examiner—C. M. Bonner
Attorney, Agent, or Firm—Elizabeth A. Levy

[57] ABSTRACT

A method is disclosed for producing tungsten carbide and a cemented tungsten carbide article therefrom which consists essentially of forming a uniform mixture of tungsten metal powder and carbon wherein the tungsten metal powder has an aveage particle size of from about 1 to about 4 micrometers in diameter, wherein the surface area of the carbon is no greater than about 12 m$^2$/g, and wherein the amount of the carbon is sufficient to react with essentially all of the tungsten to produce tungsten carbide in the subsequent heating step, heating the mixture in a non-oxidizing atmosphere at a temperature of at least about 1200° C. for a sufficient time to produce tungsten carbide wherein the amount of free carbon is less than about 0.05% by weight and wherein the tungsten carbide has an average particle size of from about 1 to about 4 micrometers in diameter, forming a uniform second mixture of the tungsten carbide powder, a wax binder, and cobalt powder wherein the cobalt content of the second mixture is from about 3% to about 20% by weight of the second mixture, forming a green article from the second mixture, and sintering the green article at a temperature of from about 1400° C. to about 1300° C. to produce the cemented tungsten carbide article wherein the microstructure of the cemented tungsten carbide article exhibits an average of no more than 1 grain having a particle size of greater than about 7 micrometers in diameter per about 0.15 cm$^2$ of surface of the article.

10 Claims, 5 Drawing Sheets

METHOD FOR PRODUCING TUNGSTEN CARBIDE AND CEMENTED TUNGSTEN CARBIDE ARTICLE THEREFROM HAVING A UNIFORM MICROSTRUCTURE

This is a continuation of copending application Ser. No. 07/343,118, filed on 04/25/89 abandoned.

This invention is related to application Ser. No. 07/343,118, now abandoned entitled "Method For Producing Tungsten Carbide And Cemented Tungsten Carbide Article Therefrom Having a Uniform Microstructure", assigned to the same assignee as the present application and filed concurrently herewith.

BACKGROUND OF THE INVENTION

This invention relates to methods for producing tungsten carbide in which the surface area of the starting carbon is controlled to yield a uniform microstructure in a cemented tungsten carbide article made therefrom.

Inhomogeneous microstructure is believed to be detrimental to the consistent performance of sintered cemented tungsten carbide articles such as workpieces. This is caused by the presence of coarse grains. Coarse grains have been found to adversely affect the strength properties and to cause poor uneven surface conditions after grinding.

Therefore a method to produce a uniform microstructure in such articles would be very desirable.

SUMMARY OF THE INVENTION

In accordance with one aspect of the invention, there is provided a method for producing tungsten carbide which consists essentially of forming a uniform mixrure of tungsten metal powder and carbon wherein the tungsten metal powder has an average particle size of from about 1 to about 4 micrometers in diameter, wherein the surface area of the carbon is no greater than about 12 $m^2/g$, and wherein the amount of the carbon is sufficient to react with essentially all of the tungsten to produce tungsten carbide in the subsequent heating step, heating the mixture in a non-oxidizing atmosphere at a temperature of at least about 1200° C. for a sufficient time to produce tungsten carbide wherein the amount of free carbon is less than about 0.05% by weight and wherein the tungsten carbide has an average particle size of from about 1 to about 4 micrometers in diameter.

In accordance with another aspect of the invention, there is provided a method for producing a cemented tungsten carbide article from the above described tungsten carbide which consists essentially of forming a uniform second mixture of the tungsten carbide powder, a wax binder, and cobalt powder wherein the cobalt content of the second mixture is from about 3% to about 20% by weight of the second mixture, forming a green article from the second mixture, and sintering the green article at a temperature of from about 1400° C. to about 1500° C. to produce the cemented tungsten carbide article wherein the microstructure of the cemented tungsten carbide article exhibits an average of no more than 1 grain having a particle size of greater than about 7 micrometers in diameter per about 0.15 $cm^2$ of surface of the article.

DETAILED DESCRIPTION OF THE INVENTION

Figure 1:
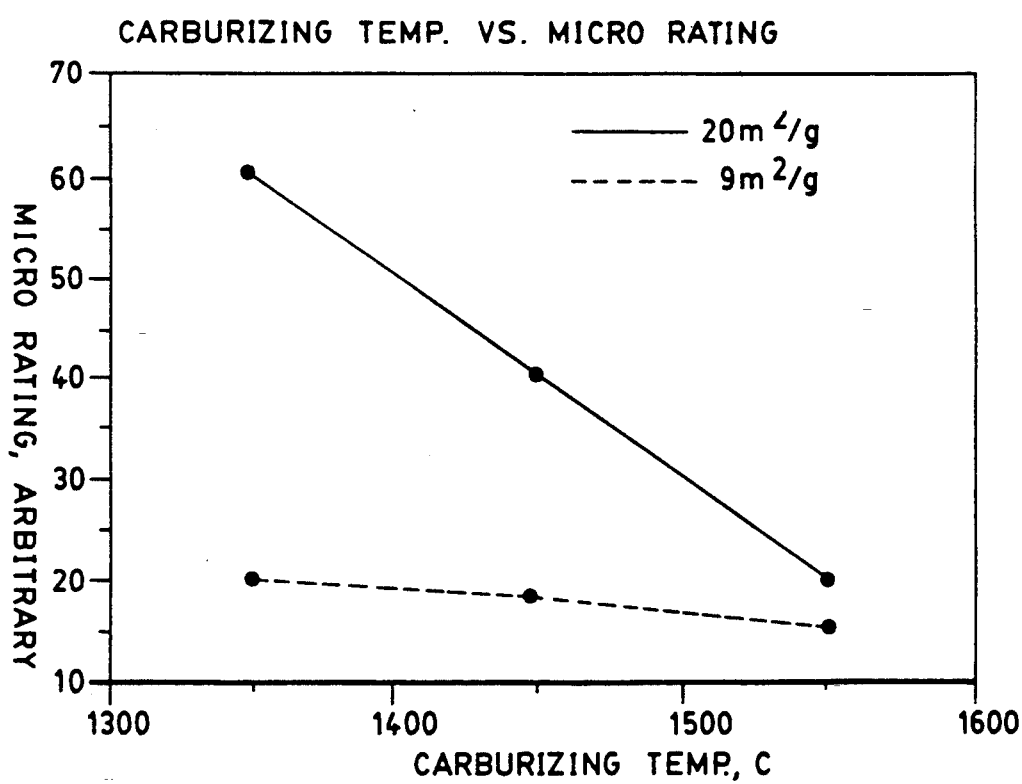
FIG. 1 is a plot of carburizing temperature versus arbitrary numerical designations indicating the quality of the microstructure of cemented tungsten carbide articles made from tungsten carbide produced using carbon for two carbon surface area ranges.

For a better understanding of the present invention, together with other and further objects, advantages and capabilities thereof, reference is made to the following disclosure and appended claims in connection with the above described figures and description of some of the aspects of the invention.

The process of the present invention results in production of relatively uniform tungsten carbide powder in the range of from about 1 to about 4 micrometers in diameter.

The present invention results in production of a cemented tungsten carbide article in which the microstructure is uniform and therefore some of the physical properties of the cemented tungsten carbide article are improved.

The article produced by the process of the present invention is typically a workpiece such as mine tool bits.

The starting tungsten metal powder has a particle size of from about 1 to about 4.0 in diameter and preferably from about 1 to about 3.5 micrometers in diameter. The particle size is critical because it determines the particle size of the resulting subsequently produced tungsten carbide powder which is critical to obtaining the desired properties in the final cemented tungsten carbide article made therefrom. The particle size of the starting tungsten powder is important when used with the carbon of the specific surface area described below to yield the desired uniform microstructure in the resulting cemented tungsten carbide.

The surface area of the carbon is no greater than about 12 $m^2/g$ and preferably from about 8 $m^2/g$ to about 10 $m^2/g$. The surface area is measured by BET. The surface area of the carbon is important to the practice of the present invention. It has been found that high quality microstructure is attained in cemented tungsten carbide articles made with the tungsten carbide which is made according to the present invention using carbon having the above described surface area values. The above described carbon surface areas of the present invention result in a more controlled rate of carburization than has been previously attained with prior higher carbon surface area values. The above surface areas result in a more uniform distribution of tungsten carbide grains which results in a more uniform microstructure in cemented tungsten carbide articles produced therefrom. By microstructural quality is meant the degree of distribution of the WC grains in the cobalt. A high quality microstructure according to the present invention, is one that exhibits a narrow grain size distribution, that is, an average of no more than 1 grain of no greater than about 7 micrometers in diameter per about 0.15 $cm^2$ of any surface of the article. The quality of microstructure is determined normally by examination under about 200×magnification.

The tungsten powder is mixed with carbon by standard techniques to form a uniform first mixture. The amount of carbon that is added is sufficient to react with essentially all of the tungsten to produce tungsten carbide in the subsequent heating step.

This first mixture is then heated at a temperature of at least about 1200° C., preferably from about 1200° C. to about 1600° C. and most preferably from about 1550° C. to about 1600° C. for a sufficient time in a non-oxidizing atmosphere preferably hydrogen to produce tungsten carbide powder. This process is called carburization. The higher the carburization temperature the higher the quality of the microstructure, that is the more uniform is the distribution of the WC grains in the cobalt. However, use of the above described particle sizes of carbon in the carburization step results in a uniform microstructure with the lower temperature ranges described. The time of heating depends on factors such as temperature, particle size of the starting tungsten, the size of the charge, nature of the equipment, etc.

The resulting tungsten carbide powder is then normally deagglomerated by dry milling.

The resulting tungsten carbide powder is then mixed with cobalt and a suitable wax binder to form a second mixture in which the cobalt makes up from about 3% to about 20% and most typically from about 6% to about 10% by weight of the second mixture. The wax binder is typically a paraffin-based or polyethylene glycol-based binder. The wax binder makes up normally about 2% by weight of the second mixture. The second mixture can be formed by any blending or milling technique. Attritor milling is the preferred technique. The resulting tungsten carbide-cobalt powder is called grade powder.

A green article is then formed from the second mixture or grade powder. This is done typically by cold pressing such as by using hydraulic pressing or by isostatic pressing. The green article can have any size and shape.

The green article is then sintered at a temperature of from about 1380° C. for a sufficent time to achieve a sintered article of near-full theoretical density. Sintering is done according to known methods. For example, when polyethylene glycol is used as the organic binder, the binder is evacuated in a hydrogen atmosphere and sintering is done under vacuum. The article has a uniform microstructure when examined under magnification, typically about 200×, that is, it exhibits an average of no more than 1 grain having a particle size greater than about 7 micrometers in diameter per about 0.15 cm$^2$ of surface of the article. Normally there are no greater than about 2 such grains per 0.15 cm$^2$ of surface. It is to be understood that any method of examination of the article surfaces can be employed to determine the presence of coarse grains. One method used is described below with accompanying Figures.

Figure 2:
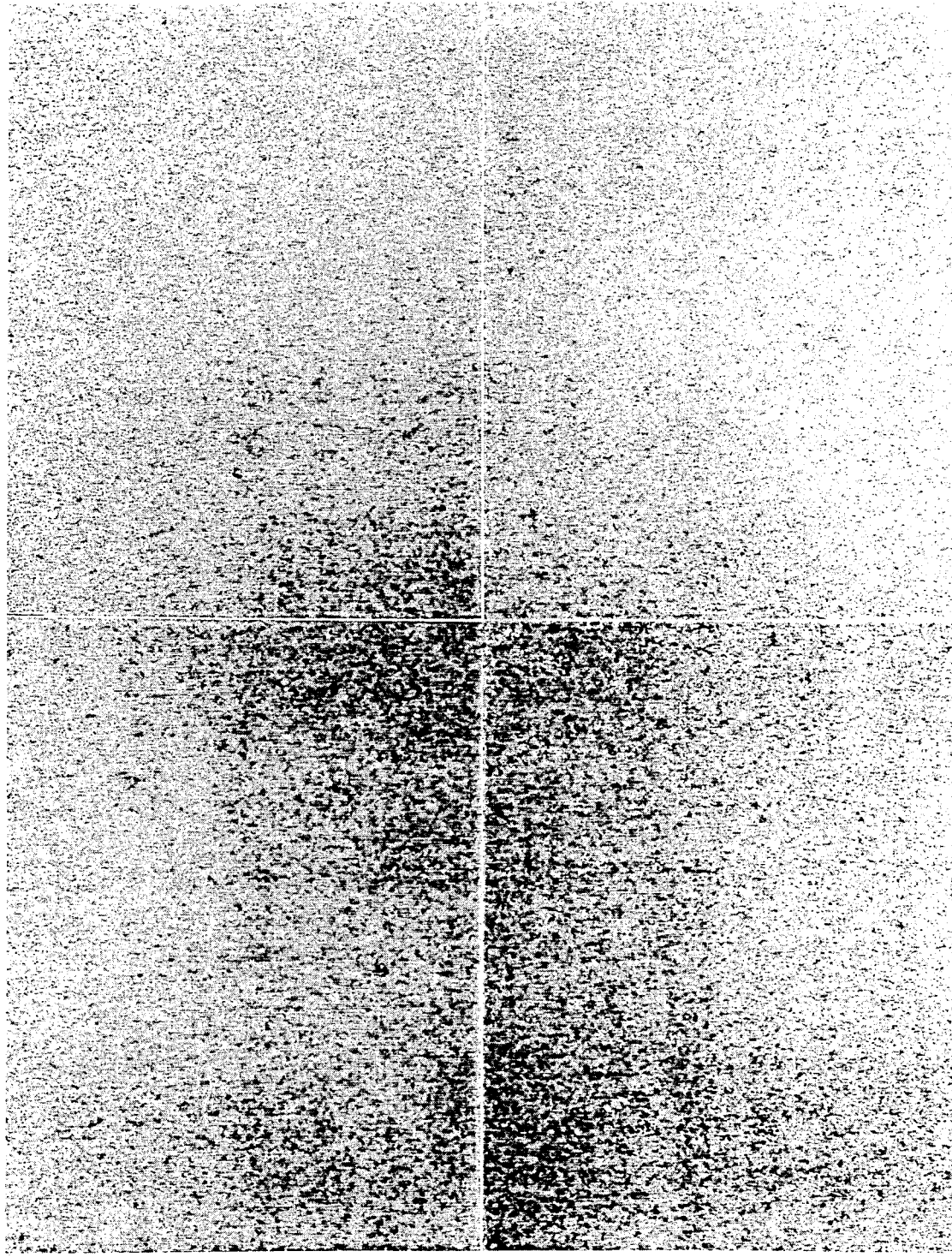
FIGS. 2, 3, 4, and 5 are photomicrographs at 200×magnification, each showing 0.15 $cm^2$ of a surface of a cemented tungsten carbide article of varying degrees of microstructure uniformity.
Figure 3:
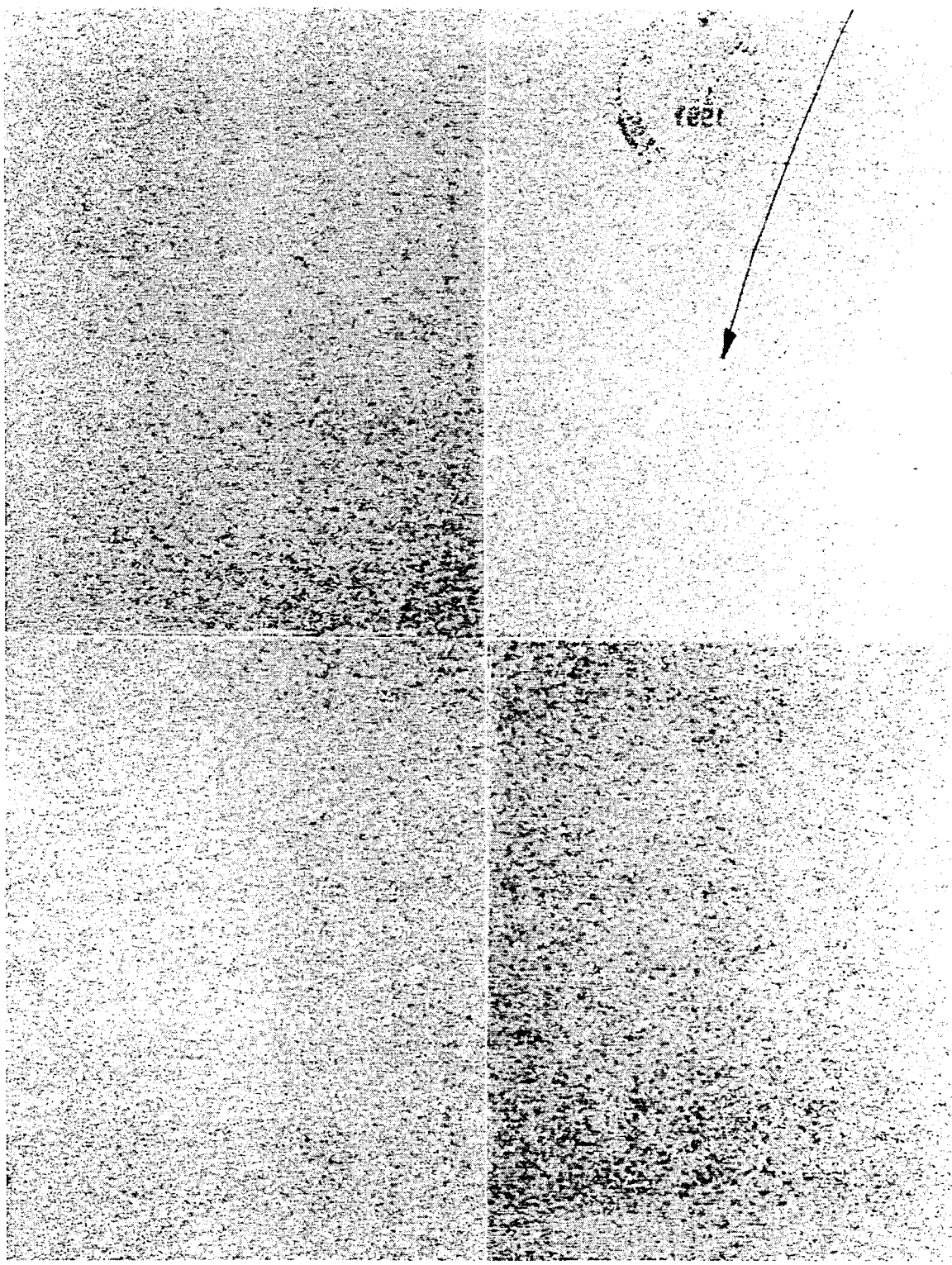
Figure 4:
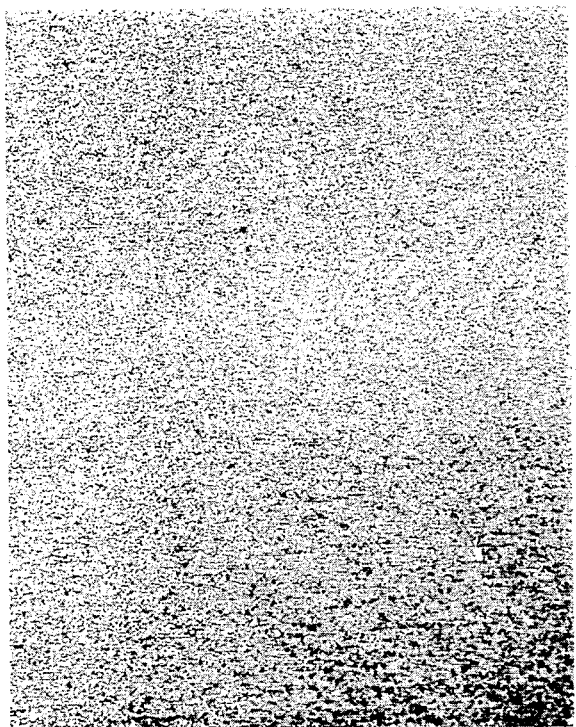
Figure 5:
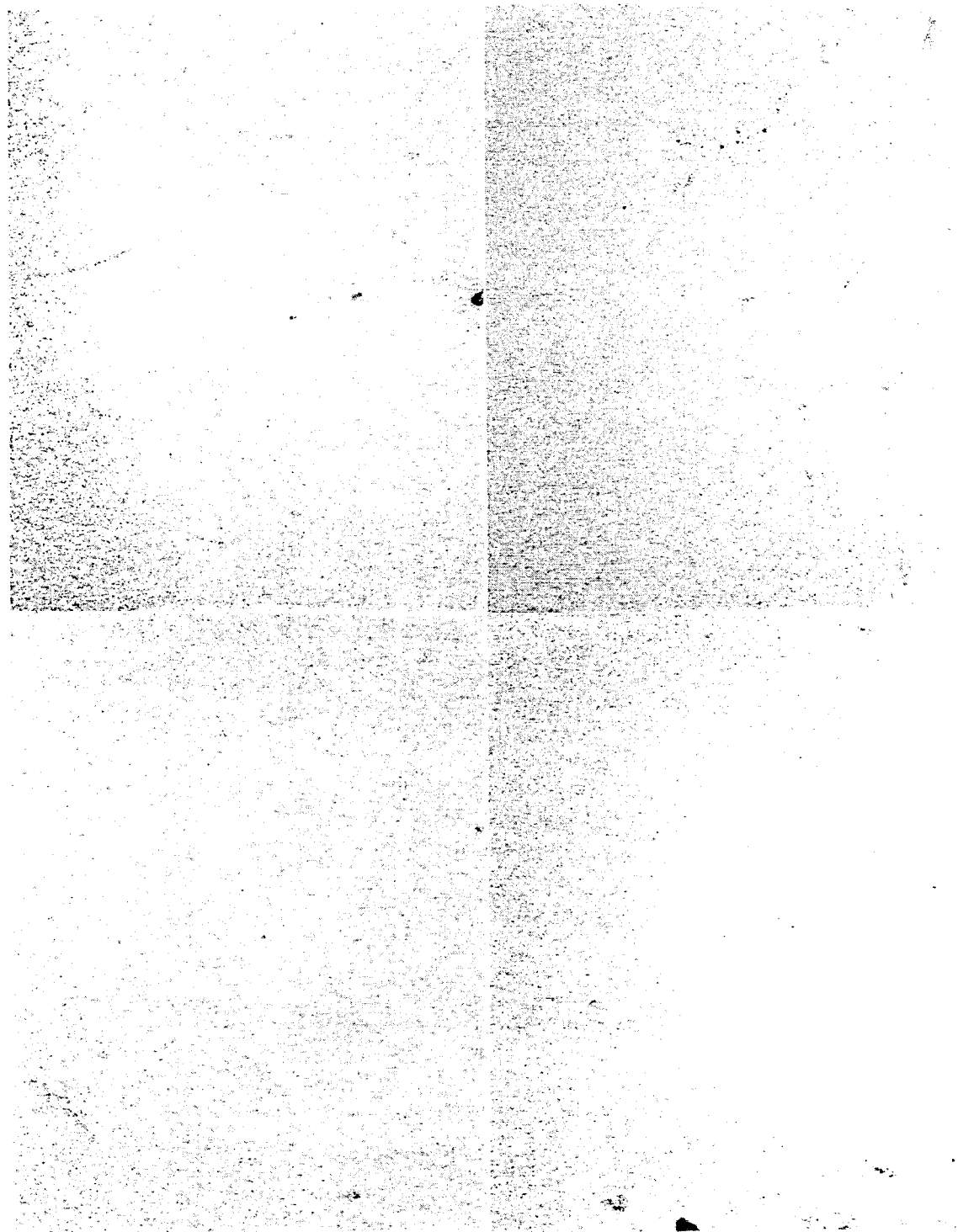

FIG. 1 is a plot of carburizing temperature versus arbitrary numerical designations indicating the quality of the microstructure for tungsten carbide having about 6% by weight cobalt made from tungsten carbide produced using carbon of two different surface areas. One surface area is about 20 m$^2$/g which is the prior method, and the other surface area is about 9 m$^2$/g which is the present invention. The number is related to the number of coarse grains, that is, grains of greater than about 7 micrometers in diameter. The numbers given in the figure represent the average of the results of examination of a number of polished surfaces of a particular article. The lower the number, the lower the number of coarse grains and the more uniform is the microstructure. It can be seen that the higher temperatures of the present invention result in better microstructures than the more conventional lower temperatures. The lower the carbon surface area within the range of the present invention results in a more uniform microstructure. The combination of the lower surface area and the higher temperatures yields the lowest numbers and therefore the most uniform microstructure. FIGS. 2, 3, 4, and 5 are photomicrographs showing what the microstructure looks like under about 200×magnification. Each figure shows about 0.15 cm$^2$ of surface of a cemented tungsten carbide article. The number rating for each figure represents the average of scanning about 1.2 cm$^2$ of surface of the article. The white spots are coarse grains. A typical white spot is shown by the arrow in FIG. 3. FIG. 2 has the numerical designation of 0 indicating essentially no grains that are larger than about 7 micrometers in diameter and this uniform microsturcture can be seen visually. FIGS. 3, 4, and 5 have numerical ratings of 33, 66 and 100 respectively with the number of coarse grains visible in the field of view increasing as the rating increases. For the purpose of the present invention ratings of 0 to about 40 exhibit a uniform microstructure, with ratings of 0 to about 20 being especially preferred.

To more fully illustrate this invention, the following nonlimiting examples are presented. All parts, portions, and percentages are by weight unless otherwise stated.

EXAMPLE 1

Two mixtures (A and B) of WC are prepared by combining about 938.9 parts of tungsten powder having a Fisher Subseive size of about 1.45 micrometers in diameter with about 61.1 parts of carbon and milling the mixture in a 5" mill for about 2 hours. The BET surface area of the carbon source in sample A is about 20.0 m$^2$/g and in sample B is about 9.0 m$^2$/g. The resulting homogeneous mixtures of W and C are then carburized at about 1350° C. for about 3 hours to produce samples of WC powder. About 188 parts of each of the WC samples is combined with about 12 parts of cobalt powder and about 4 parts of paraffin wax and milled for about 2 hours in an attritor mill. The resulting samples of the resulting WC-Co grade powder are then pressed into parts and sintered at about 1435° C. for about 45 minutes. The microstructural ratings are determined on about 0.15 cm$^2$ surfaces as described previously.

Analysis of the resulting cemented WC parts is given below:

Sample A: 20.0 m$^2$/g; A rating of 66 (prior method).
Sample B: 9.0 m$^2$/g; A rating of 20 (method of this invention).

EXAMPLE 2

A sample of WC is prepared in the same manner as in Example 1 except that the carburization temperature is about 1550° C. The BET surface area of the carbon used is about 9.0 m$^2$/g. The microstructural rating is 16.

The above examples show that the microstructural quality is better with the lower carbon surface areas of the present invention and with the higher carburization temperatures.

While there has been shown and described what are at present considered the preferred embodiments of the invention, it will be obvious to those skilled in the art that various changes and modifications may be made therein without departing from the scope of the invention as defined by the appended claims.

What is claimed is:

1. A method for producing tungsten carbide having a uniform particle size of between about 1 and 4 micrometers, said method consisting essentially of:
   a) forming a uniform mixture of tungsten metal powder and carbon wherein the average particle size of said tungsten metal powder is from about 1 micrometer to about 4 micrometers in diameter, wherein the surface area of said carbon is no greater than about 12 $m^2/g$ and wherein the amount of said carbon is sufficient to react with essentially all of said tungsten to produce tungsten carbide in the subsequent heating step; and
   b) heating said mixture in a non-oxidizing atmosphere at a temperature of at least about 1200° C. for a sufficient time to produce tungsten carbide wherein the amount of free carbon is less than about 0.05% by weight of said tungsten carbide.

2. The method of claim 1 wherein said particle size of said tungsten metal powder is from about 1 micrometer to about 3.5 micrometers in diameter.

3. The method of claim 1 wherein the surface area of said carbon is from about 8 to about 10 $m^2/g$.

4. The method of claim 1 wherein said mixture is heated at a temperature of from about 1200° C. to about 1600° C.

5. The method of claim 4 wherein said mixture is heated at a temperature of from about 1550° C. to about 1600° C.

6. A method for producing a cemented tungsten carbide article having a uniform particle size of between about 1 and 4 micrometers, said method consisting essentially of:
   a) forming a uniform first mixture of tungsten metal powder and carbon wherein said tungsten metal powder has an average particle size of from about 1 micrometer to about 4 micrometers in diameter, wherein the surface area of said carbon is no greater than about 12 $m^2/g$, and wherein the amount of said carbon is sufficient to react with essentially all of said tungsten to produce tungsten carbide in the subsequent heating step;
   b) heating said first mixture in a non-oxidizing atmosphere at a temperature of at least about 1200° C. for a sufficient time to produce tungsten carbide wherein the amount of free carbon is less than about 0.05% by weight of said tungsten carbide;
   c) forming a uniform second mixture of said tungsten carbide powder, a wax binder, and cobalt powder wherein the cobalt content of said second mixture is from about 3% to about 20% by weight of said second mixture;
   d) forming a green article from said second mixture; and
   e) sintering said green article at a temperature of from about 1400° C. to about 1500° C. to produce said cemented tungsten carbide article wherein the microsturcture of said cemented tungsten carbide article exhibits an average of no more than 1 grain having a particle size of greater than about 7 micrometers in diameter per about 0.15 $cm^2$ of surface of said article.

7. The method of claim 6 wherein the particle size of said tungsten metal powder is from about 1 micrometer to about 3.5 micrometers in diameter.

8. The method of claim 6 wherein the surface area of said carbon is from about 8 to about 10 $m^2/g$.

9. The method of claim 6 wherein said first mixture is heated at a temperature of from about 1200° C. to about 1600° C.

10. The method of claim 9 wherein said first mixture is heated at a temperature of from about 1550° C. to about 1600° C.

* * * * *